(12) United States Patent
McDougall et al.

(10) Patent No.: US 7,809,848 B1
(45) Date of Patent: Oct. 5, 2010

(54) SYSTEM AND METHOD FOR AGGREGATING NFS REQUESTS

(75) Inventors: Richard J. McDougall, Menlo Park, CA (US); David Robinson, Austin, TX (US); Spencer Shepler, Austin, TX (US); Brian L. Wong, Gordonsville, VA (US); Glenn A. Colaco, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1071 days.

(21) Appl. No.: 11/080,213

(22) Filed: Mar. 15, 2005

(51) Int. Cl.
*G06F 15/16* (2006.01)
(52) U.S. Cl. .................................................... 709/230
(58) Field of Classification Search .................. 709/230; 707/3
See application file for complete search history.

(56) References Cited

U.S. PATENT DOCUMENTS

2005/0080930 A1*  4/2005  Joseph ........................ 709/248
2006/0031520 A1*  2/2006  Bedekar et al. ............. 709/227
2006/0136376 A1*  6/2006  Jain et al. ...................... 707/3

OTHER PUBLICATIONS

RFC 3530 Shepler et al. "NFS Version 4 Protocol" Apr. 2003 http://www.ietf.org/rfc/rfc3530.txt.*
John Nagle, "Congestion Control in IP/TCP Internetworks", Jan. 6, 1984, pp. 1-9, Ford Aerospace and Communications Corporation, www.freesoft.org.

* cited by examiner

*Primary Examiner*—Ario Etienne
*Assistant Examiner*—Hee Soo Kim
(74) *Attorney, Agent, or Firm*—Park, Vaughan & Fleming LLP

(57) ABSTRACT

A system and method for decreasing the protocol processing incurred by an NFS (Network File System) client, and the network bandwidth consumed, when multiple NFS requests are issued close in time to each other. Requests received close in time to each other within one NFS client are aggregated into a single communication packet, even if they are from different NFS users, processes or applications. The per-request overhead of the NFS requests is thus avoided, and multiple streams of requests may be merged into one. When a first request is received by the client, it may be delayed for a short time to determine whether any other requests can be sent at the same time. NFS requests may be aggregated on an NFS client from multiple applications, processes, users or other entities. An NFS client may include an aggregator or other mechanism for performing the aggregation.

9 Claims, 4 Drawing Sheets

SYSTEM AND METHOD FOR AGGREGATING NFS REQUESTS

BACKGROUND

This invention relates to the field of computer systems. More particularly, a system and methods are provided for increasing the performance of an NFS (Network File System) client when sending requests to an NFS server.

The NFS protocol enables file access to be distributed across a network, so that individual NFS clients submit read and write requests to a central NFS server. The NFS protocol generally operates on top of the RPC (Remote Procedure Call), TCP (Transport Control Protocol) and IP (Internet Protocol) protocols.

Traditional implementations of the NFS protocol require separate messages to be generated and issued from a client for each NFS request. Thus, the more read and/or write requests an NFS client application generates, the greater the processing overhead incurred by the client. In particular, for each request, separate NFS, RPC, TCP and IP headers must be generated, even though the size of each individual request is smaller than some header sizes. In addition to the communication bandwidth consumed for each individual request, significant protocol processing overhead is incurred by the client.

SUMMARY

In one embodiment of the invention, a system and methods are provided for decreasing the protocol processing incurred by an NFS client, and decreasing the network bandwidth consumption, when multiple NFS requests are issued close in time to each other. In this embodiment, requests received close in time to each other within one NFS client are aggregated into a single communication message. The per-request overhead of the NFS requests is thus avoided. When a first request is received by the client, it may be delayed for a short time to determine whether any other requests can be sent at the same time. The delay period is dynamically adjustable.

NFS requests may be aggregated on an NFS client from multiple applications, processes, users or other entities. Thus, multiple streams of requests may be merged into one. An NFS client may include an aggregator or other mechanism for performing the aggregation.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for decreasing the protocol processing overhead incurred by an NFS (Network File System) client, and the network bandwidth consumed, when multiple NFS requests are issued close in time to each other. More specifically, the number of RPC requests and network messages required in order to transmit or receive a set of NFS requests is decreased.

In this embodiment, multiple NFS requests are aggregated into a single communication message to be carried over the network. Thus, in an environment in which NFS operates over RPC, TCP and IP, a single TCP/IP packet may carry a number of separate NFS requests. Traditional implementations of NFS would require a separate TCP/IP packet for each request.

In one implementation of this embodiment, for example, multiple NFS requests may be aggregated into a single RPC request (e.g., if using version 4 of NFS). Each RPC request may be carried in a single TCP message (thereby avoiding additional TCP processing).

Thus, in an optimal situation, many NFS requests issued in a short period of time are combined in a single compound NFS v4 request, which yields one TCP message. This saves processing at the RPC, TCP and IP protocol layers.

Figure 1:
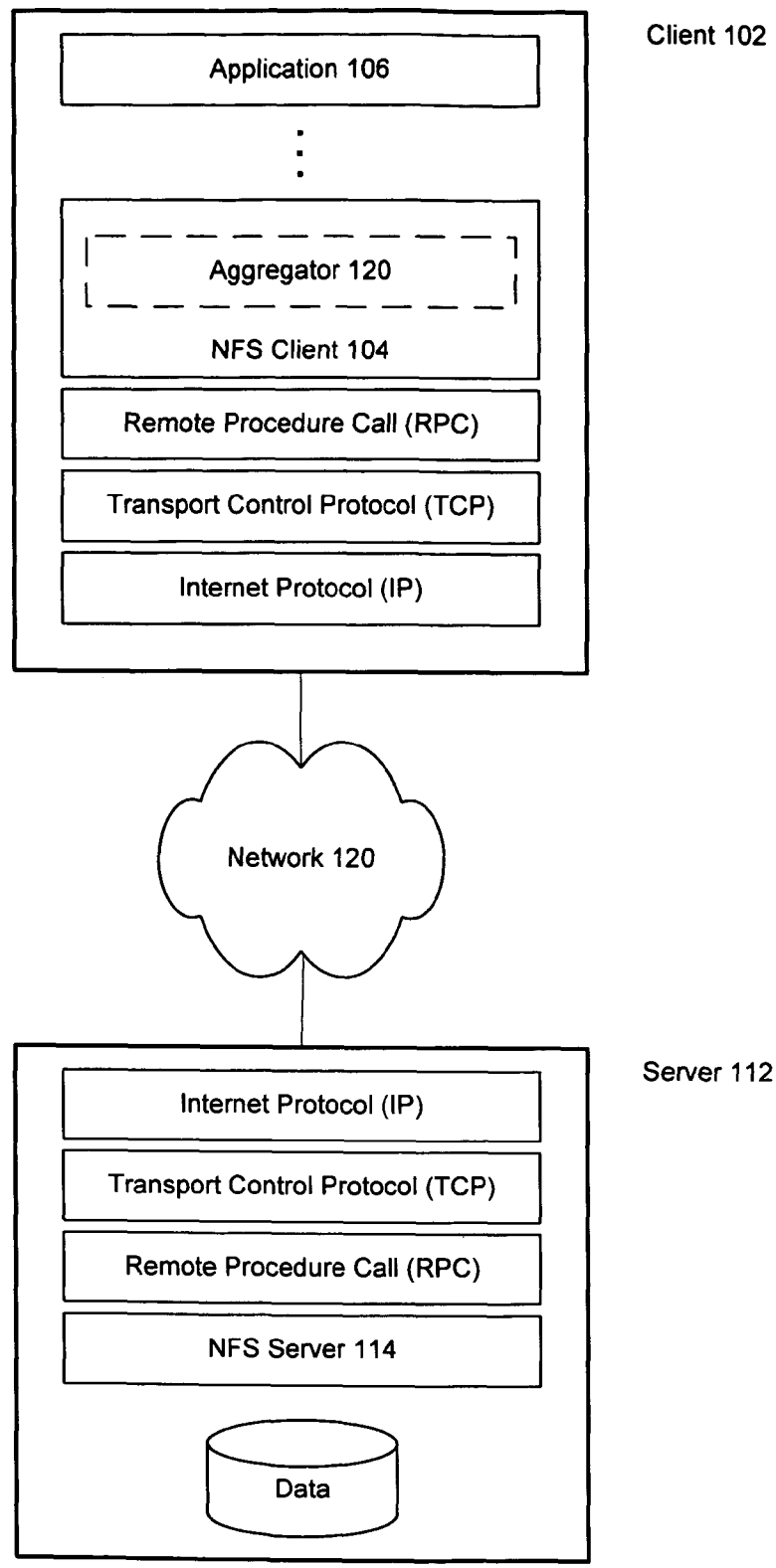
FIG. 1 is a block diagram depicting a network environment in which an embodiment of the present invention may be implemented.

FIG. 1 depicts a computing environment in which an embodiment of the invention may be implemented. In this environment, client 102 is one of multiple clients accessing data managed by server 112. The illustrated implementation of the NFS protocol uses the RPC (Remote Procedure Call) protocol and is carried in TCP/IP (Transmission Control Protocol/Internet Protocol) packets across network 120. In other embodiments of the invention, other transport protocols may be employed, such as UDP (User Datagram Protocol) or SCTP (Simple Control Transport Protocol).

Thus, client 102 and server 112 employ protocol stacks comprising IP, TCP and RPC, in addition to NFS client module 104 on client 102 and NFS server module 114 on server 112. Client 102 also executes one or more applications that employ NFS to exchange data with server 112.

As one skilled in the art will recognize, the size of a traditional NFS read request from a client, including necessary formatting for Ethernet, IP, TCP and RPC, may be on the order of 150-200 bytes. The NFS-specific portion of an NFS read request is only on the order of 100 bytes, and comprises just an NFS header (no NFS payload is required for a read request). The size of an NFS write request depends upon the amount of data being written with the request (the payload).

RPC, TCP, IP and Ethernet formatting adds significantly to the size of a traditional NFS request. Thus, the overhead of generating and appending separate Ethernet, IP, TCP and RPC headers for every NFS request can be considerable. For a busy application, a client may end up spending as many machine cycles applying the protocol stack for NFS requests as it does executing the application. Some applications that employ NFS issue read and/or write requests in bunches, and may not expect or need them to be completed in order. An embodiment of the invention may therefore be particularly well suited for implementation with an application that performs asynchronous input/output.

By aggregating multiple NFS requests into a single TCP message or flow, according to an embodiment of the present invention, significant protocol processing overhead can be avoided. In particular, in a normal Ethernet MTU (Maximum Transfer Unit) IP packet size of 1,518 bytes, approximately 10 NFS read requests could be carried with just one TCP/IP header. In a jumbo IP frame of over 9,000 bytes, in a most optimal case, approximately 60 NFS read requests could be conveyed.

Separate RPC headers may or may not be required for each read request, depending on whether version 3 or 4 of NFS is employed. Thus, the 60 NFS read requests within one jumbo IP frame may require only a single RPC header if NFS v4 compound operations are employed. Advantageously, even if the combined NFS read requests greatly exceed the maximum IP frame size, only one RPC header and one TCP header may be needed. For example, if the total size of the aggregated read requests is on the order of 128 kilobytes, 14 jumbo (e.g., 9 k) IP frames would be needed to carry the aggregation, but only a single RPC header would have to be processed.

Depending on their size, write requests could be similarly aggregated. The requests that are aggregated by an NFS client may or may not be from different applications, but are generally issued to the same NFS server.

One skilled in the art will appreciate that another benefit derived from the aggregation of NFS requests is obtained in the area of security credentials. In particular, one set of credentials is generated for each RPC request. As a result, when using NFS version 4 in an embodiment of the invention, only one set of credentials may be required for multiple, aggregated, NFS requests accompanied by a single RPC request, especially if they are for the same principal.

Figure 2A:
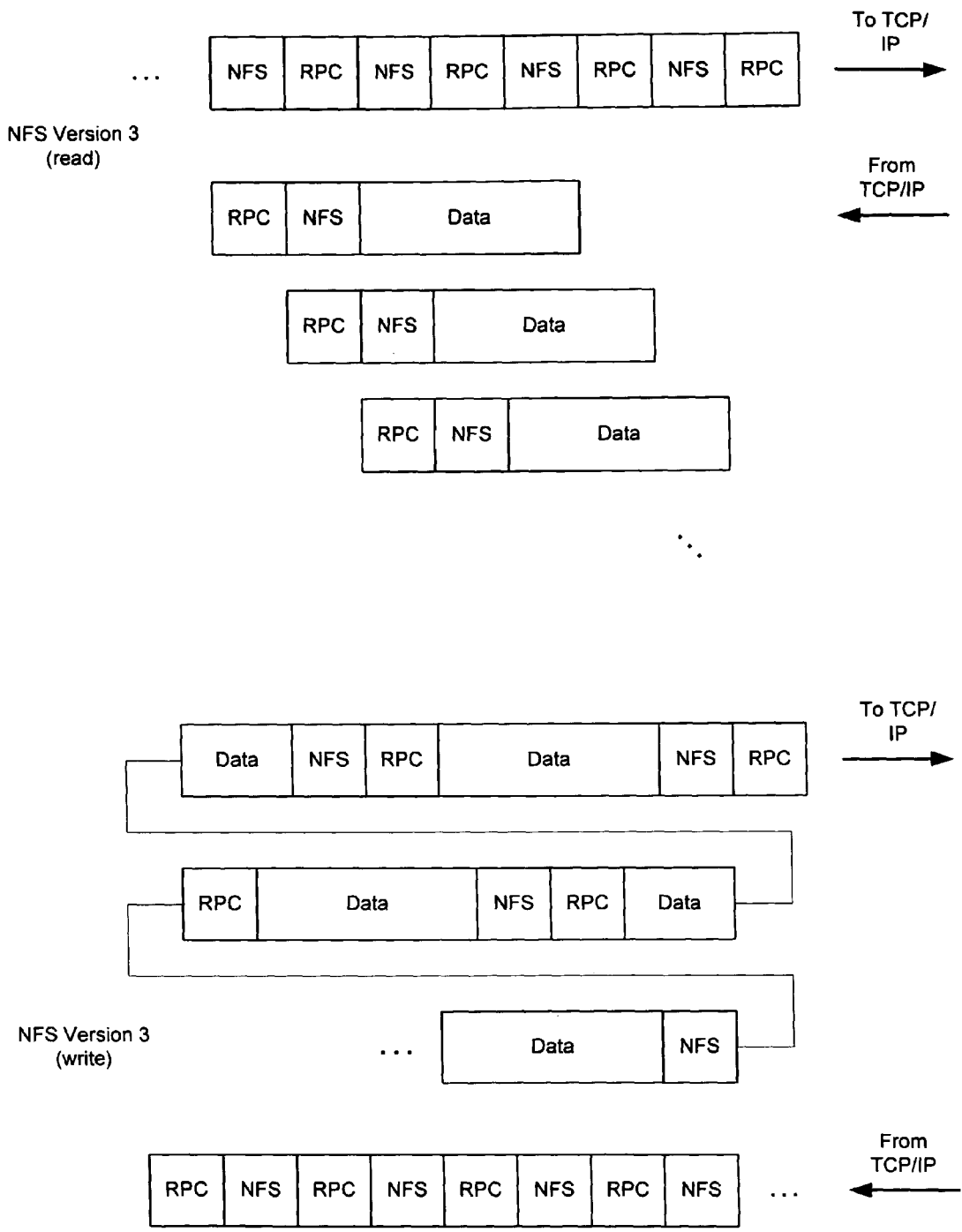
FIGS. 2A-2B demonstrate the aggregation of NFS read and write requests, according to embodiments of the invention.
Figure 2B:
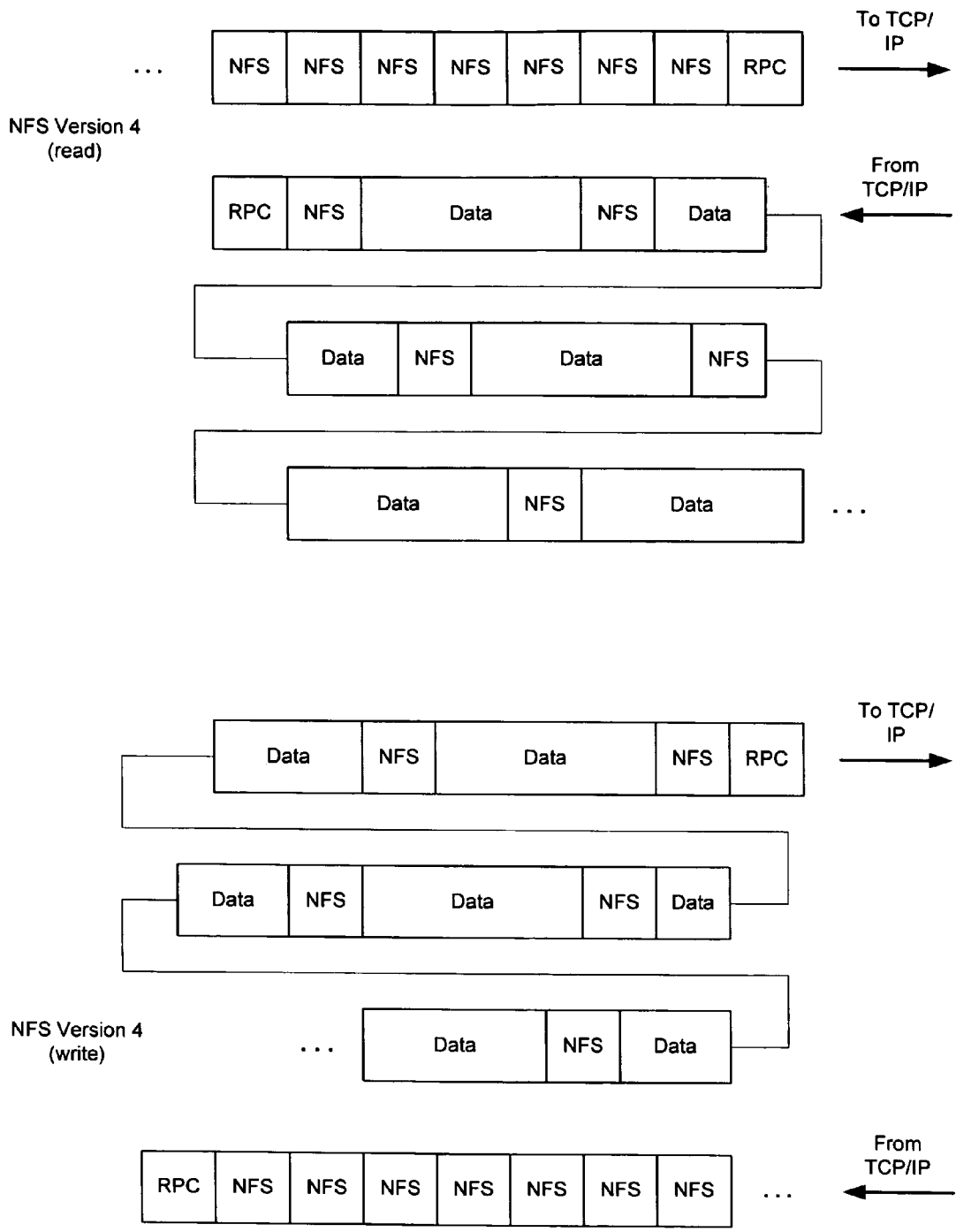

FIGS. 2A-B demonstrate the aggregation of multiple NFS requests according to various embodiments of the invention. FIG. 2A displays the format of aggregated read and write requests to an NFS server from an NFS version 3 client, via TCP/IP, as well as the corresponding responses from the server. FIG. 2B displays aggregated read and write requests for an NFS version 4 client, and the corresponding responses.

In FIG. 2A, for NFS version 3 read requests, NFS/RPC forwards aggregated NFS and RPC headers for each request. Because read requests require no payload, the datagram passed to the TCP/IP protocol stack comprises an RPC header and an NFS header for each request. If the merged requests will fit into one TCP/IP packet, the TCP/IP stack only needs to be applied once. In response, the NFS client receives separate read responses for each request. Each response includes an RPC header, an NFS header and a payload (i.e., the data requested from the server).

For each NFS version 3 write request, NFS/RPC forwards an RPC header, an NFS header and the NFS payload (i.e., the data to be written to the NFS server). The contents of multiple write requests are concatenated before being passed to the TCP/IP stack. TCP/IP will segment the concatenated requests into as many packets as are necessary. In response to the write requests, the NFS client receives from the NFS server a set of responses, each response comprising an RPC header and an NFS header indicating whether the write was successful. Although latency may be incurred while the server assembles the responses, this may be offset by the reduction in protocol processing experienced by the server (i.e., while formatting the responses for network transmission) and the client (i.e., while processing the single response). In one alternative embodiment, responses to the client's v3 writes may be issued separately.

In FIG. 2B, for NFS version 4 read requests only one RPC header is required. Thus, NFS/RPC sends a single RPC header and a number of aggregated read requests (i.e., NFS headers) to the TCP/IP stack. In reply, the NFS client receives the requested data, which may be concatenated with a single RPC header or packaged in multiple read responses.

A number of write requests, including the data to be written, may also be concatenated with a single RPC header. The TCP/IP stack will segment the set of requests as necessary. In response, the NFS client may receive a single RPC header with a number of responses (acknowledgements).

In one embodiment of the invention, an NFS client is augmented with an aggregator to collect multiple NFS requests. Traditionally, an NFS client allowed each application, process or user to issue its own requests, independent of other applications, processes or users. However, because multiple requests to a single server are to be combined for processing through TCP/IP (or other transport protocols), the aggregator is employed to issue requests for the NFS applications, processes or users.

For example, client 104 of FIG. 1 may be enhanced with aggregator 120 to collect requests from threads of application 106. Each thread's requests are funneled to the aggregator, which will concatenate or aggregate them as shown in FIGS. 2A-B. More particularly, application threads issue NFS operations then block to await their responses. When the aggregator receives an operation it delays forwarding the operation to the NFS server, in order to aggregate other requests.

Thus, an aggregator may combine multiple streams of NFS requests (from different threads, applications, processes, users) into one. Parameters for aggregating requests may be dynamic, such as a maximum period of time to hold a request for aggregation (e.g., one millisecond), a minimum number of requests to aggregate (e.g., five), etc.

In one embodiment of the invention, historical data are used to determine whether or not to aggregate requests. For example, a history may be kept for a predetermined period of time (e.g., one second). If, on average, the number of NFS requests received during this period exceeds a threshold (e.g., 1000), then aggregation may be enabled.

Other information may be considered when determining whether to enable aggregation. For example, if a system processor usage level (on an instantaneous, average or other basis) is greater than a threshold (e.g., 99%), then aggregation may be initiated.

For different types of applications, processes or users, different default time periods for holding a request (for aggregation with other requests) may be applied, depending on how much additional latency can be tolerated. For example; an application that employs asynchronous input/output may be able to tolerate more latency in responses to its requests than an application that employs synchronous input/output. Or, an average response time could be observed for a set of NFS requests (e.g., 5 milliseconds) and a default delay value could be set to some percentage of that average (e.g., 10 percent).

In other embodiments of the invention, NFS requests may be aggregated based on some characteristic of the data being read or written, such as filename, directory, filesystem, user, etc. This allows a further reduction in overhead by combining multiple operations using the same file handle. For example, a series of read requests using the same file handle would traditionally appear similar to the following:

{PUTFH, READ1} {PUTFH, READ2} {PUTFH, READ3}

In one embodiment of the invention, these requests may be aggregated into one request:

{PUTFH, READ1, PUTFH, READ2, PUTFH, READ3}

In one alternative embodiment of the invention, the requests may be combined further, since they all use the same file handle:

{PUTFH, READ1, READ2, READ3}

Different embodiments of the invention may be activated in different ways. For example, one embodiment of the invention implemented for a Unix environment may be activated using an option or parameter supplied with a mount command.

Figure 3:
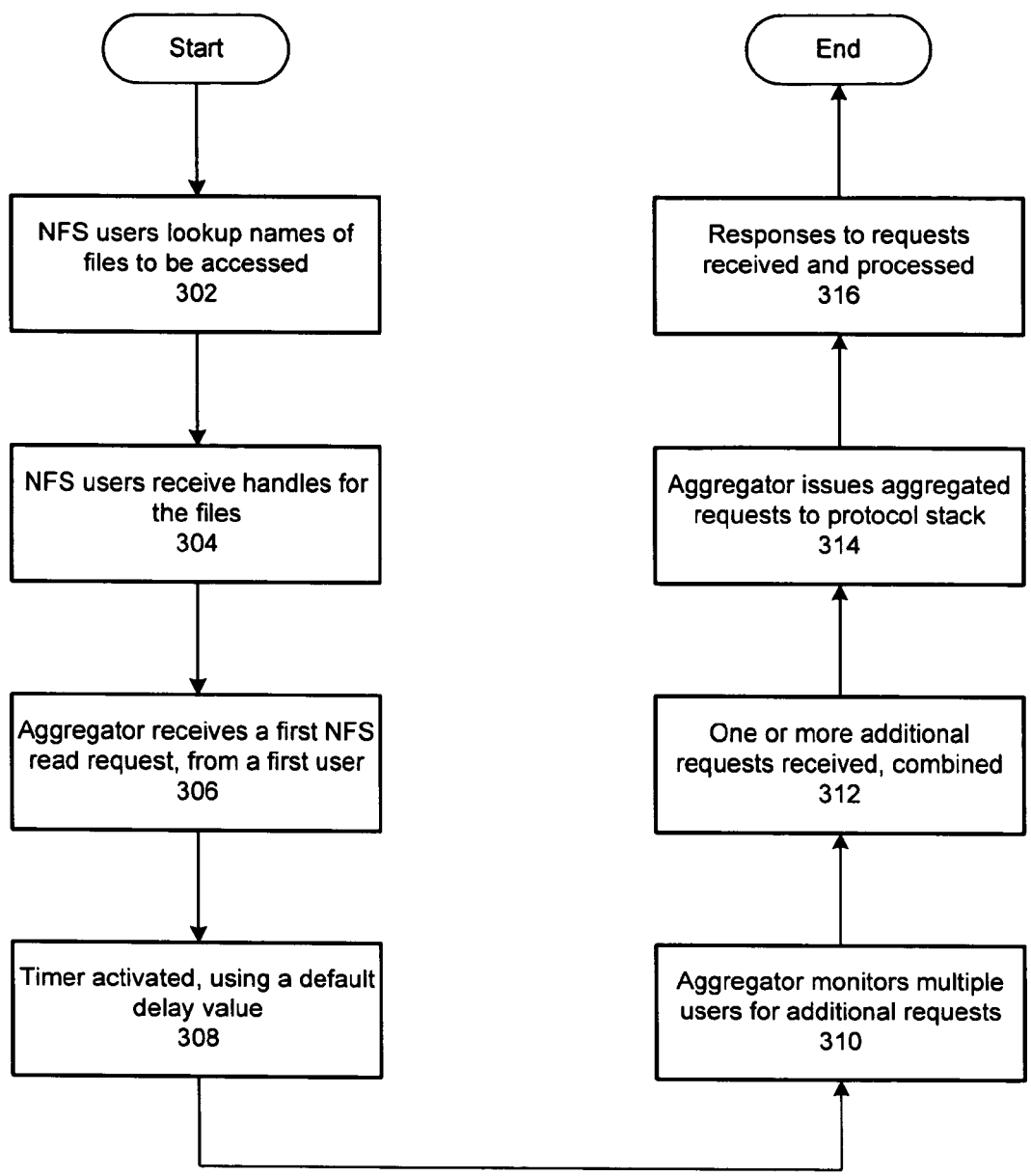
FIG. 3 is a flowchart illustrating one method of aggregating multiple NFS requests in accordance with an embodiment of the invention.

FIG. 3 depicts a method for aggregating multiple NFS requests at one NFS client, according to one embodiment of the invention. Other embodiments may be derived from the following description.

In operation 302, multiple NFS users or processes (e.g., users, user threads, threads or processes of an NFS application) lookup names of files to be accessed. This may be done in the traditional manner, by contacting an NFS server using separate or combined lookup requests.

In operation 304, the users or processes receive handles or file identifiers for identifying the files they wish to access.

In operation 306, an aggregator operating as part of an NFS client receives from a first NFS user a first read request for a file managed by or stored on the NFS server.

In operation 308, in response to the first request the aggregator initiates a timer or starts observing the passage of time. A default time or delay period may be approximately 500 microseconds.

In operation 310, while the time period passes, the first request is deferred and the aggregator monitors the users or processes for additional requests (read or write requests).

In operation 312, one or more additional requests are received during the time period, from the same or a different user, process or application. The aggregator combines the multiple requests with separate NFS headers for each. Separate RPC headers may also be generated, depending on the version of NFS in use.

In operation 314, the aggregated requests are issued to TCP/IP or other transport protocols, for packetization and transport to the NFS server. In this embodiment, only one set of TCP/IP headers is required for multiple NFS requests, rather than one set of TCP/IP headers for each request.

In operation 316, the NFS client receives responses to the multiple, aggregated requests, and processes them to forward the responses to the users or processes.

As described above, the delay time period applied by the aggregator may be decreased or increased in response to the pattern of NFS requests it receives. A history may be kept of the rate of requests (e.g., how many requests are received per second). The rate may be compared to pre-defined thresholds to determine whether to dynamically adjust the delay period.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of aggregating multiple NFS (Network File System) protocol requests within an NFS client, the method comprising:
   from a first source, receiving a first NFS read request from a first application thread at the NFS client;
   delaying said first NFS read request for a delay period at the NFS client; from a second source, receiving additional separate NFS requests during said delay period at the NFS client, wherein the first source and the second source are different sources of NFS requests;
   wherein delaying the first NFS read request involves dynamically adjusting said delay period based on the total number of NFS requests in said first NFS read request and said additional NFS requests, wherein dynamically adjusting said delay period involves increasing said delay period if said total number is greater than a threshold number;
   combining said first NFS read request and said additional NFS requests at the NFS client, wherein said combining comprises:
      concatenating a single remote procedure call (RPC) header and, for each of said NFS read request and said addition NFS requests, a separate NFS header, or
      concatenating, for each of said NFS read request and said additional NFS requests, an RPC header and an NFS header; and
   at the end of said delay period, passing said combined requests to a transport protocol for transport to an NFS server in a single transport layer message.

2. The method of claim 1, wherein said dynamically adjusting further comprises decreasing said delay period if said total number is less than a threshold number.

3. The method of claim 1, wherein said combining is based on a file characteristic associated with the received NFS requests, wherein the file characteristics comprise at least one of a filename, a directory, or a file system.

4. The method of claim 1, wherein the method further comprises:
   determining if one or more of the NFS requests are directed to a same file handle; and
   when one or more of the NFS requests are directed to a same file, further compacting the combined requests to remove redundant references to the file.

5. A non-transitory computer readable medium storing instructions that, when executed by a computer, cause the computer to perform a method of aggregating multiple NFS (Network File System) protocol requests within an NFS client, the method comprising:
   from a first source, receiving a first NFS read request from a first application thread at the NFS client;
   delaying said first NFS read request for a delay period at the NFS client;
   from a second source, receiving additional separate NFS requests during said delay period at the NFS client, wherein the first source and the second source are different sources of NFS requests;
   wherein delaying the first NFS read request involves dynamically adjusting said delay period based on the total number of NFS requests in said first NFS read request and said additional NFS requests wherein dynamically adjusting said delay period involves increasing said delay period if said total number is greater than a threshold number;

combining said first NFS read request and said additional NFS requests at the NFS client, wherein said combining comprises:
  concatenating a single RPC header and, for each of said NFS read request and said additional NFS requests, a separate NFS header, or
  concatenating for each of said NFS read request and said additional NFS requests, an RPC header and an NFS header; and
at the end of said delay period, passing said combined requests to a transport protocol for transport to an NFS server in a single transport layer message.

6. An apparatus for aggregating multiple NFS (Network File System) protocol requests directed to a single NFS server, comprising:
  a transport protocol stack comprising one or more communication protocols configured to issue communication packets to the NFS server;
  an NFS client configured to issue NFS requests to the NFS server on behalf of a plurality of separate NFS users, wherein issuing the requests involves issuing separate requests for each of two different NFS users;
  an aggregator at the NFS client configured to aggregate multiple NFS requests for transport to the NFS server and to forward the aggregated requests to the transport protocol stack for a generation of a single transport layer message that contains the aggregated requests;
  wherein said aggregator aggregates the multiple NFS requests by:
    passing said transport protocol stack a single RPC header and separate NFS headers for each of the multiple NFS requests, or
    passing said transport protocol stack separate RPC headers and separate NFS headers for each of the multiple NFS requests; and
  a timer at the NFS client configured to time a delay period during which the multiple NFS requests are received by the aggregator;
  wherein said aggregator is configured to adjust said delay period based on the number of requests in the multiple NFS requests, wherein the aggregator increases said delay period if said number of requests is greater than a threshold number.

7. The apparatus of claim 6, wherein the NFS client comprises said aggregator.

8. The apparatus of claim 6, wherein said aggregator is configured to:
  initiate said delay period in response to receive of a first NFS request of the multiple NFS requests; and
  postpone the first NFS request until the end of said delay period.

9. The apparatus of claim 6, wherein said transport protocol stack comprises TCP (Transport Control Protocol) and IP (Internet Protocol).

* * * * *